United States Patent
Lucas

(10) Patent No.: US 11,402,060 B2
(45) Date of Patent: Aug. 2, 2022

(54) MECHANICAL ARTICULATION SYSTEM WITH ELECTRICAL AND/OR THERMAL CONDUCTIVITY VIA INVISIBLE, ADJUSTABLE BALL-AND-SOCKET JOINT

(71) Applicant: EIDOPIA, S.L., Madrid (ES)

(72) Inventor: Garcia Rodriguez Lucas, Madrid (ES)

( * ) Notice: Subject to any disclaimer, the term of this patent is extended or adjusted under 35 U.S.C. 154(b) by 31 days.

(21) Appl. No.: 16/873,950

(22) PCT Filed: Feb. 28, 2019

(86) PCT No.: PCT/ES2019/070120
§ 371 (c)(1),
(2) Date: Aug. 24, 2020

(87) PCT Pub. No.: WO2019/166682
PCT Pub. Date: Sep. 6, 2019

(65) Prior Publication Data
US 2021/0364125 A1  Nov. 25, 2021

(30) Foreign Application Priority Data
Mar. 2, 2018  (ES) .................................. P201830205

(51) Int. Cl.
*F16M 13/00* (2006.01)
*F16M 13/02* (2006.01)
*F21V 21/14* (2006.01)
*F21Y 115/10* (2016.01)

(52) U.S. Cl.
CPC .......... *F16M 13/022* (2013.01); *F21V 21/14* (2013.01); *F16M 2200/022* (2013.01); *F21Y 2115/10* (2016.08)

(58) Field of Classification Search
CPC .............................. F16M 13/022; F21V 21/14
See application file for complete search history.

(56) References Cited

U.S. PATENT DOCUMENTS

| | | | |
|---|---|---|---|
| 9,097,379 B1* | 8/2015 | Strasser | F16M 11/10 |
| 10,371,196 B1* | 8/2019 | Zaloom | A47B 23/04 |
| 10,718,120 B1* | 7/2020 | Haney | E04G 5/003 |
| 2010/0020389 A1* | 1/2010 | Schmidt | G02B 7/22 |
| | | | 359/350 |
| 2010/0046212 A1* | 2/2010 | Thirouin | F21L 4/04 |
| | | | 362/198 |
| 2018/0070901 A1* | 3/2018 | Gabella | A61B 6/102 |
| 2018/0178637 A1* | 6/2018 | Brion | E05F 15/657 |
| 2019/0071905 A1* | 3/2019 | Migliorini | E05D 9/00 |
| 2019/0199277 A1* | 6/2019 | Tordo | F24S 25/70 |
| 2020/0146639 A1* | 5/2020 | Campagna | A61B 6/0442 |

\* cited by examiner

*Primary Examiner* — Gerald J Sufleta, II

(57) ABSTRACT

Mechanical joint system with electrical and/or thermal conduction capability by means of an invisible adjustable hinge that connects and allows rotation of one body respects another one, i.e. a male body and a female body, by the integration of a rigid J-shaped joining part which enters perpendicularly through an access opening on the female face at any rotation position, and whose external end is fixed to the male body. The female body is internally equipped with a brake system that couples, guides and fixes the curved end of the J-shaped joining part and blocks its rotation movement. The J-shaped joining part integrates an electrical and/or thermal conductor that makes this invention of great interest for electronic devices with adjustable orientation, including LED lighting ones.

11 Claims, 9 Drawing Sheets

(Existing typical system)

MECHANICAL ARTICULATION SYSTEM WITH ELECTRICAL AND/OR THERMAL CONDUCTIVITY VIA INVISIBLE, ADJUSTABLE BALL-AND-SOCKET JOINT

The present invention relates to a mechanical hinge system with electrical and/or thermal conduction capability to connect a male body (1) and a female body (2) by means of a friction hinge integrated on a way that makes it invisible to the naked eye and which is located on the surface of the female body which rotates respect to the male body by means of a rigid J-shaped joining part (3) with a curved end. This geometry is given as a result of a sweep of the cross-section of the J-shaped joining part along a circumference arc whose axis (0) is placed on the female body opening face. The J-shaped joining part goes perpendicularly through the face of the female body by an access opening area where, due to its curved end, stays adjusted and retained by the friction exerted by a sandwich brake system (4).

The specific geometry of this innovative hinge offers as main advantage that rotation and orientation of a body respects another is achieved from joint ends located directly on flat faces, differently from conventional rotation solids in which the rotating element must be placed in prominent areas of the male body such as vertices, edges or protuberances. Besides, this invention totally protects the mechanism that allows rotation, in a way that degradation, wear and damage to the system meaningfully decrease since the system is not exposed to the outside.

Multiple embodiments may be designed and built with a J-shaped joining part (3) that may be hollow, with an inner structure consisting of one or several conduits or channels to allow a path for signal transmission and electric power wires without being neither strangled nor exposed, or integrated as a rigid element, such as a thermal tube, a heatpipe or any other phase change thermal element, those being compatible with the wire passing, or the possibility of hinge and brake being built in a thermal and/or electric conductive material.

The different versions and possible embodiments make this invention of great interest as an integrated subsystem of electronic and lighting devices, for fixing and tilting screens, cameras, image projectors, spotlights or LED lamps, among others, and all this with a meaningful reduction in size, number of components and total weight of the device.

TECHNICAL FIELD

The described invention is framed within the articulated systems by means of a virtual rotating axis between solid elements, meaning, without a shaft or physical convergence axis neither any pivot support, which is the case of, for instance, butt hinges or other conventional hinges, and finds its main application in the area of lighting and electronic devices, given the possibility of thermal transfer, data transfer and electrical power conduction due to its key components.

STATE OF THE ART

There exists a mechanical essential problem inherent to rotating systems which are located in the centre of a body face: due to merely geometric matters, it is necessary that its rotation axis is located out of such body face, otherwise the body face itself would crash and block rotation of any other element connected to the cited axis.

Refer to the articulated system to join two bodies illustrated in FIG. 21, rotation is only possible if hm>wf y hf>wm. This justifies the fact that hinges and adjustable joints are installed on ends or edges, or externally to the elements they are connecting; therefore, a protuberance is needed for the axis to preserve the joint convergence. To improve integration, some systems may implement a visible groove which does not solve the problem and promotes water and dust accumulation, speeding up the full system degradation.

Based on this, the first technical problem this invention intends to solve is the implementation of a rotation system located on the face centre of the joined element, and not necessarily on an end or edge, leaving the joint free of any kind of protuberances and/or grooves and reducing the mechanical elements exposed to the outside. To achieve this, and due to above reasons, a virtual axis is needed (not a physical one or shaft). Such axis is not contained by any system part.

The concept of "virtual" rotating axis, different from a physical convergence axis, shaft or pivot support between two solids, already exists in the state of the art for certain uses, being the most popular one the hidden hinges between suspended or tilted panels, mainly applied to doors and windows, or for lids or covers in some devices.

Among hinge systems, the most accepted one due to its simplicity and versatility is the concealed hinge for cabinet doors, which is not visible from the outside and takes its name from one of the two parts it consists of: a support fixed to the structure and a groove milled on one of the doors that holds the movable parts that allows tilting movement. Other hidden hinge systems with a higher complexity level have been developed and patented.

U.S. Pat. No. 4,123,822A refers to a hinge without pivot pin. This system without any pin or shaft, meaning without a physical axis or shaft for rotation and joint, includes an element with a C-shaped groove that fits with a second element with a curved surface with complementary geometry. When first and second elements are assembled to build the joint structure, the convex and concave surfaces of the second element face the first and second support surface to allow both elements pivoting one respect another. A similar solution is taken in U.S. Pat. No. 5,329,667 published in 1994, which consists on a hinge without any pin to build a pivot joint to connect panels or lids, such as components for ship windscreens.

U.S. Pat. No. 2,056,805A suggests a hinge with several curved retractable elements, one guided and a second one contained over the first one, which acts as a track, in a way that a curved displacement respect to a virtual axis is allowed, without any physical shaft. This concept was also taken in U.S. Pat. No. 4,554,700A, applied to a vacuum-cleaning machine with two lids, an inner one and an outer second one, in a way that each of them was welded to multiple curved guided elements similar to the ones already cited above, which allows not seeing the rotation system in the "closed" state only, although some of the elements are exposed and visible to the naked eye in "open" state. The two tracks on each of the lids, one on top another, and these on top of the body, share a same rotation axis located on the inner face where the lids are anchored to the body, so they enter obliquely to the body face and the lids themselves. This kind of hinge requires an abrupt shape change between the lid and the track area, being both parts welded, and they do not respect any geometrical continuity.

All these hinge systems are implemented on the edges of the joined movable elements, and not on their flat uniform faces; therefore these systems are not a valid solution for the articulated system premises suggested in this invention for the connection of two solid elements through their flat faces, such as a spotlight fixed by its rear shell face to a flat face supporting panel.

Only the case of a joint system for windows and doors implemented on the flat faces of the connected lids is contained in the German patent DE10301046-A1. The virtual rotation axis is integrated in one side of a first fixed lid by means of an articulated C-shaped joint with a movable curved plate joined to the second movable lid. The C-shaped curved plate is arranged within the fixed lid by means of a hollow inner slot on one side, and mechanically joint to the second movable lid on its second side. Nevertheless, differently from the mechanical invisible hinge system in this invention, the German joint system is based on an articulated joint, not a rigid one, and does not include an adjustable brake system, which is convenient for a hinge system applicable to lighting devices, displays, vision or projection systems which may be oriented respect to a flat surface.

The ability to fix a specific rotation position without any variation caused by the system weight is an important feature for a hinge to be effective for most applications. The most natural effect is that the physical shaft exerts pressure to the two main body elements in a way they get closer and friction increases, such is the adjustable male-female hinge in U.S. Pat. No. 6,530,123, mainly for the laptop market, with a clip hinge system with a shell that exerts friction against the shaft and locks rotation movement. This basis has been implemented in this hinge by means of a brake allocated inside of the movable element.

On the other hand, the path for power and electrical signal wires inside a J-shaped end joining part, such as the one used as essential component in the present invention, has not been used before and is not trivial for a hinge system. The widespread solution is to pass the wires through a hollow screw or cylinder which constitutes a physical shaft, what induces constrains in rotation movement to avoid damage on the wires due to safety reasons.

If more than one physical shaft is considered, several solutions exist that allow passing wires through the hinge, such as patent US20080141488-A1, which consists of a hinge for stringed musical instruments on trips, or US20120090135-A1, published in 2012, about hinges with inner electrical wires also exposed to the outside, with damage or cut hazard.

Neither has previously been patented a rotation system with the capability of efficient thermal transfer by means of passive elements such as a thermal conductor material, or a phase-change heat transfer device, as a heatpipe or a vapour chamber; except those solutions relying on flexible heatpipes in patents US20080092973-A1 or U.S. Pat. No. 3,604,504-A that, being conceptually simple, present important technical difficulties to be implemented due to costs, size and robustness. This problem is not easy to be solved because, generally, rotation implies the rupture of thermal contact between movable elements.

Thanks to the definition of a very specific geometry, the invisible hinge system depicted in this invention allows a new approach to solve an old problem. Although this innovative solution may seem simple, it means a significant conceptual and pragmatic shift respect to available solutions, not being evident its correct performance, especially in maximum rotation angle between both movable bodies, since friction in this case is minimum and depends on the rotation position.

DESCRIPTION OF THE INVENTION

The mechanical articulated system with capability for electric and/or thermal conduction consisting of an invisible and adjustable hinge claimed as invention in this document is the essential concept of an integrated system for joint and connection of two solid bodies through their faces, meaning not through a vertex, corners nor edges; without protuberances neither visible mechanical elements. The two solid bodies are joined through their faces at any of their relative rotational positions by means of a virtual rotation axis, i.e. without any physical shaft or material pivot support, being its essential components as follows:

The two solid bodies with ability of mutual rotation, the first body with an opening on a face that allows access to its interior, which will be named as female body, and the second body, which will be named as male body.

At least one J-shaped joining part with an end to connect both bodies. The cross-section of this joining part may have any geometry, being preferred a laminar one with rectangular cross-section or a tubular one with circular or elliptical cross-section, whose opposite end, which is external to the female body, may be fixed to the male body, or mechanically coupled to it. The curved end of this J-shaped joining part passes perpendicularly through the face of the female body. The geometry of the curved end of the joining part is defined by a sweep of their cross-section over the circumference arc whose virtual axis is essentially located on the face of the female body where the opening is placed.

A brake system located inside the female body, consisting of two parts (that may be part of the female body), that couples, guides and fixes the curved end of the J-shaped joining part by means of a sandwich configuration. This brake system is mechanically adjusted by screws, clamping system, wing nut or similar solutions, which exert pressure to the sandwich brake subsystem and cause friction between them and the J-shaped joining part, acting as locking elements and blocking movement. While the brake system is in a relaxed state, the hinge claimed in this invention allows to control the rotation angle formed by male and female bodies. The hinge may integrate an additional azimuthal rotation system in a way that the system is allowed $2\pi$ stereo radians full orientation.

The opening on the female body face which the J-shaped joining part goes through may have a passing protection frame (38) that avoids direct contact between the edges of the opening and the joining part, such that prevents potential scratches and damage of the joining part caused by rotation. This element may be included in the female body or in the brake system. The passing protection frame may be built in a flexible material, such as silicone, and be attached tightly to the joining part and female body in a way that blocks the entrance of particles, dust and water, offering a high level of IP protection.

The hinge, specifically the J-shaped joining part and/or the brake, may be built in thermal and/or electrical conductive material for electrical power and/or heat transfer between the male and female body; thanks to the J-shaped joining part, the continuity of the electrical and thermal paths is ensured among the movable elements. The J-shaped joining part may be totally or partially hollow, with one or several longitudinal conduits or channels which may integrate a rigid phase-change thermal transfer device, such as a heatpipe or a vapour chamber, and/or allow an inner path for wires, shields or cables to transfer data, matter and/or energy between the male and female body.

The sandwich surfaces of the brake system in direct contact with the J-shaped joining part and/or the surface of the J-shaped joining part in contact with the sandwich brake system may be covered by a film or a coating with antifriction features for smooth rotation. Nevertheless, in order to improve the rotation control of the hinge, the surface of the curved end of the J-shaped joining part (3) in contact with any brake part may also be totally or partially notched, slotted or present indentations or micro-structures for angle pitch adjusted, in a way that friction is controlled for certain angular steps and/or by a gear driven by a motor inside the female body in order to control the rotation position.

Additionally, the brake system may be controlled by the user handling from the outside, by means of unblocking subsystems based on screw or pushbutton.

A blocking mechanism in the brake system may be set by a screw in one of the brake parts in a way that, when the screw is tightened, friction increases against the J-shaped joining part. An unblocking mechanism may consist of screws with springs or clamps as locking element and a preshbutton such that the brake system is released when pressure is exerted against the springs or clamps, allowing hinge movement and orientation.

The system may also be equipped with a telescopic subsystem, consisting of a straight J-shaped joining part end outside of the female body, which perpendicularly crosses one face of the male body and is held by a spring (36) with one end coupled to the male body and the other end to the joint part in such a way that it exerts a force on the joint part perpendicular to said face towards the inside of the male body that provides the hinge with a retractable function that reduces the total height of the system, which allows a greater integration.

Given the described features of the invention, which not only allows rotation of two bodies joined through their faces but also heat, electrical power, and electrical data transference, the female body may be equipped with an electronic power device, such as an LED power source or a laser, a projector system, a vision system or an LCD screen, a semiconductor or integrated circuits, among others.

If needed, such is the case for LED devices, the invention may additionally include heat fins or a heatsink to increase heat dissipation to the surroundings without increasing meaningfully the full system volume.

Advantages.

This innovative articulated mechanical hinge system presents a series of important advantages, but not limited to:

Mechanic Advantages:
Rotation of the movable bodies from a joint on one of its faces is allowed, unlike existing systems where joint and rotation take place in specific locations such as vertex, edges or protuberances.
Less degradation of the rotating system, since all its components are protected and placed inside the body, without being exposed to the external medium.
Superior control of the friction force is provided thanks to a system to adjust orientation in a reliable and comfortable way.

Geometry Advantages:
Improved cleanability. The invention avoids dust accumulation, since it is free of external elements and protuberances and the joint directly enters in the female body, without nuts, screws, or shafts.

Thermal Advantages:
Effective heat transfer is allowed since the system establishes an efficient continuous thermal path between the movable elements, while using thermal conductive materials and/or a rigid joining part consisting of a phase-change heat transfer device.

Costs Advantages:
A lower number of system components is required and hence the final product and assembly cost may be decreased.

BRIEF DESCRIPTION OF DRAWINGS

A series of figures is included at the end of this document showing illustrative schemes of the described invisible adjustable hinge system. These figures are not intended to be a limitation on the present invention.

DESCRIPTION OF EXAMPLES OF EMBODIMENTS

Figure 1:
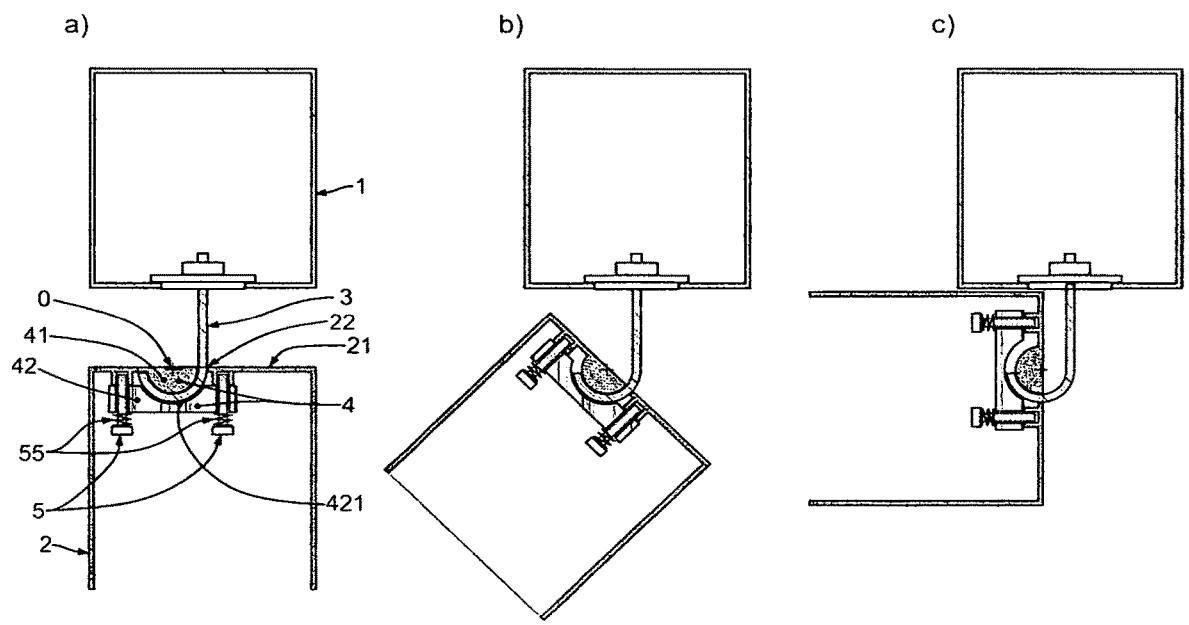
FIG. 1 shows the novel hinge cross-section view for 0°, 45° and 90° angle positions, where the main components are: a J-shaped joining part, which enters perpendicularly on the female body (2) at any rotation position through an opening on its face and it can be adjusted and blocked by a brake system (4) inside the female body.

This hinge invention may be integrated in a great variety of systems; hence, it may be adapted to comply with specific technical requirements depending on the system needs but giving as a result similar implementation. Examples of embodiments that incorporate one or more aspects of the present invention are described and illustrated in the drawings. These illustrated examples are not intended to be a limitation on the present invention. For example, one or more aspects of the present invention can be utilized in other embodiments insofar as they come within the scope of the claims.

FIG. 1 illustrates a view on the schematic embodiment cross-section for 0°, 45° and 90° hinge angle positions, a female body (2) with a face (21) with an opening (22) on its central area; the curved end of the J-shaped joining part (3) enters through the opening (22) and gets attached inside the female body (2) whereas its straight end is joined to the male body (1); an inner brake component (41) inside the female body (2) consisting of a half-cylinder geometry that, in this case, is integrated in the female body structure, and a outer brake component (42) with a concave cylindrical surface (421). These surfaces are corradial with a same shared virtual axis (0), which is located on the face of the female body (2). The J-shaped joining part (3) passes perpendicularly through the opening at every hinge possible orientation.

The curved end of the J-shaped joining part (3) is delimited and blocked between the two brake parts as in a sandwich configuration which guides and limits the hinge displacement allowing only rotation movement. A clamping pressure is exerted by inner screws (5) and springs (55) between the sandwich brake components, high enough as to avoid the hinge movement and slippage between the brake parts due to the female body (2) weight, but allowing rotation with aid of an external additional force such as the applied one when manually handling the system by a user. These same screws allow fixing the brake components to the female body. All hinge mechanical parts are protected inside the embodiment.

Depending on the selected materials to build the invention, the brake surfaces in direct contact with the J-shaped joining part (3), or the curved end of the J-shaped joining part in direct contact with the brakes, may include a film or a coating cover to improve friction, whose nature may be generally polymeric.

The correct performance of this full system is not trivial, especially when fixed at 90° angle position (FIG. 1*c*), since the friction area is minimal, and the distribution of the exerted pressure by the sandwich brake system screws (5) and springs (55) varies and depends on rotation.

Figure 2:
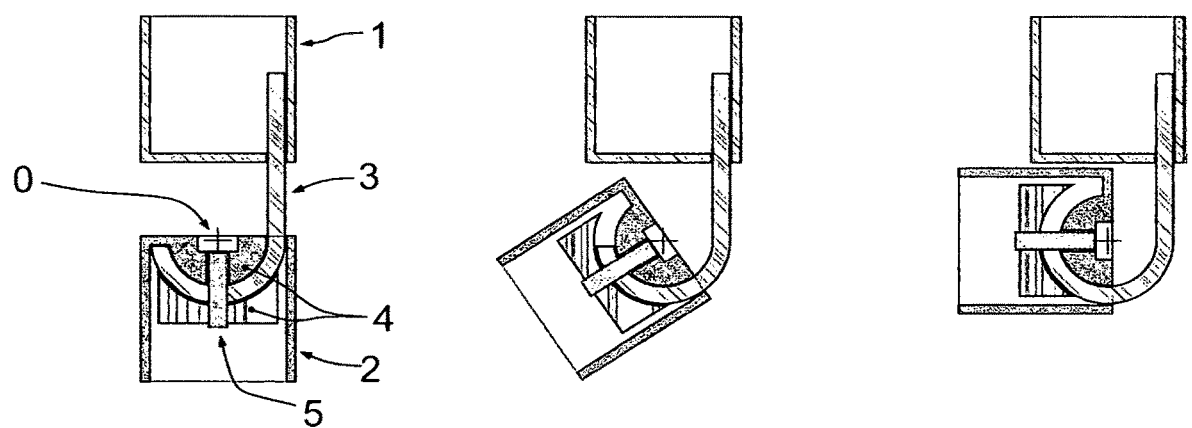
FIG. 2 shows the described hinge cross-section view as a simplified version, with a screw (without springs) as blocking system, centered in the brake system with access from the outside. The screw head is generally not visible since it is hidden by the J-shaped joining part.

In FIG. 2, a similar concept is depicted, with the straight end of the J-shaped joining part welded to the male body (1), without springs as part of the brake blocking system and with blocking screw heads accessible from the outside and in a centered position of the brake system, which permits a narrower hinge. Due to the rotation orientation, the screw may be inaccessible and protected by the hinge components, although the screws may be installed from the inside as well.

Figure 3:
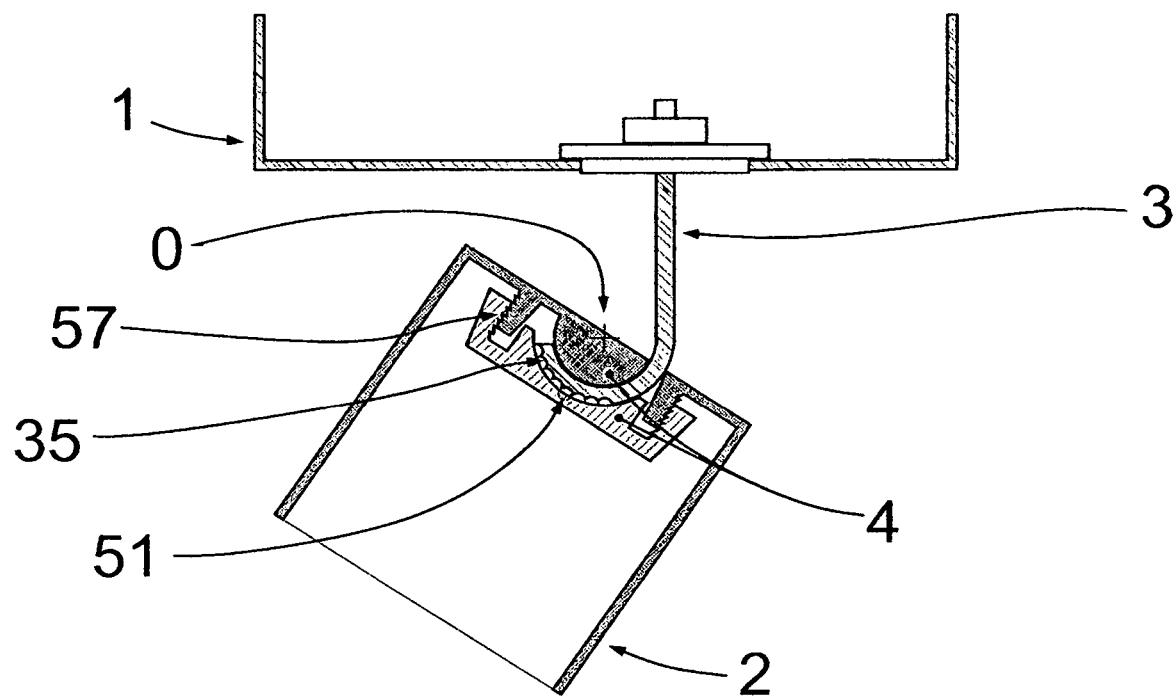
FIG. 3 illustrates the invention cross-section view with grooved or dented surface (35) of the J-shaped joining part and a brake with one or more teeth (51), with a clamp (57) to activate the blocking system comprising the sandwich brake elements.

FIG. 3 illustrates one embodiment with blocking system by clamp (57) and the curved end of the J-shaped joining part with grooved or dented surface (35) for friction control purposes. Moreover, this area is hidden to the eye from the outside. The brake surface has one or more teeth (51) or bumb that couples with the hinge grooved or dented geometry, which allows a discrete angular pitch and a calibrated control of the hinge system orientation.

Figure 4:
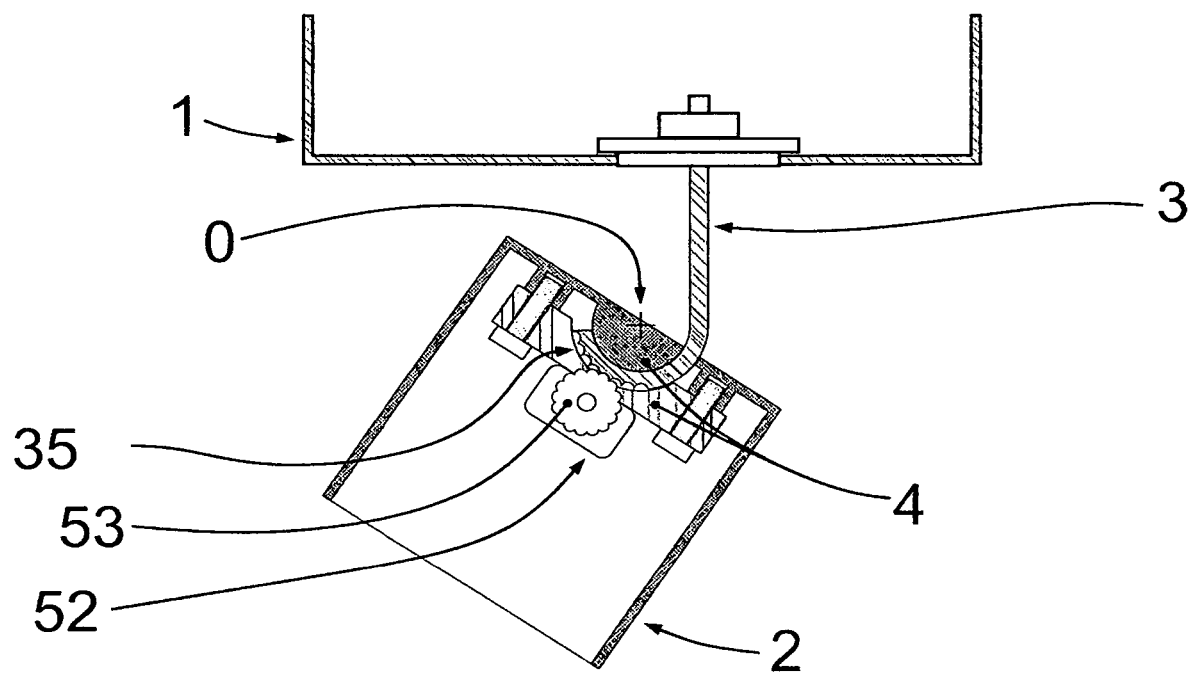
FIG. 4 includes a motor (52) with a gear (53) for rotation control.

FIG. 4 illustrates an embodiment similar to the previous one, with increased capability for automatic or semi-automatic orientation control and position control by an electric motor (52) with a gear (53) which couples with the grooved or dented surface of the J-shaped joining part.

Figure 5:
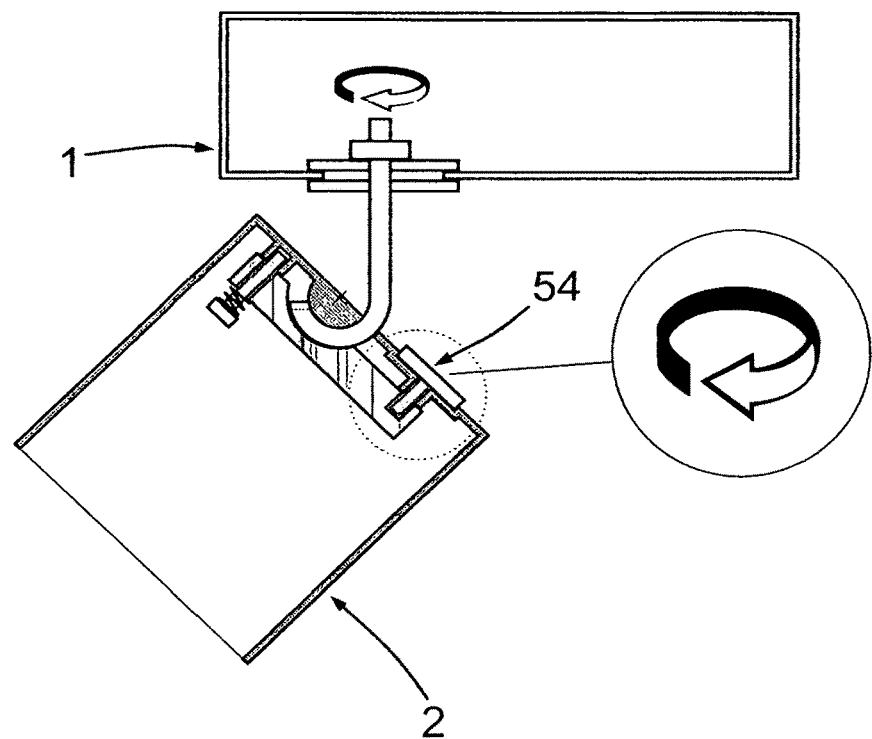
FIGS. 5 and 6 illustrates two cross-section views of hinge with a subsystem for blocking the position by means of a screw (55) and unblocking position by means of a pushbutton (56) from the outside, respectively.

The invention allows blocking rotation by means of a screw (54), as illustrated in FIG. 5. When the screw is tightened from the outside, the sandwich brake system exerts more friction and the female body orientation gets fixed and blocked, whereas if the screw is loosened, the join can be rotated till the desired orientation. It may also be equipped with an unblocking system such as in FIG. 6, which consists of a screw (5) with springs (55) or clamps as blocking elements and a mechanical pushbutton (56) which can be pressed from the outside and exerts pressure against the spring or clamp reducing the friction by the sandwich system and unblocking the hinge movement. This way, the hinge orientation can be adjusted by pressing the pushbutton.

Figure 6:
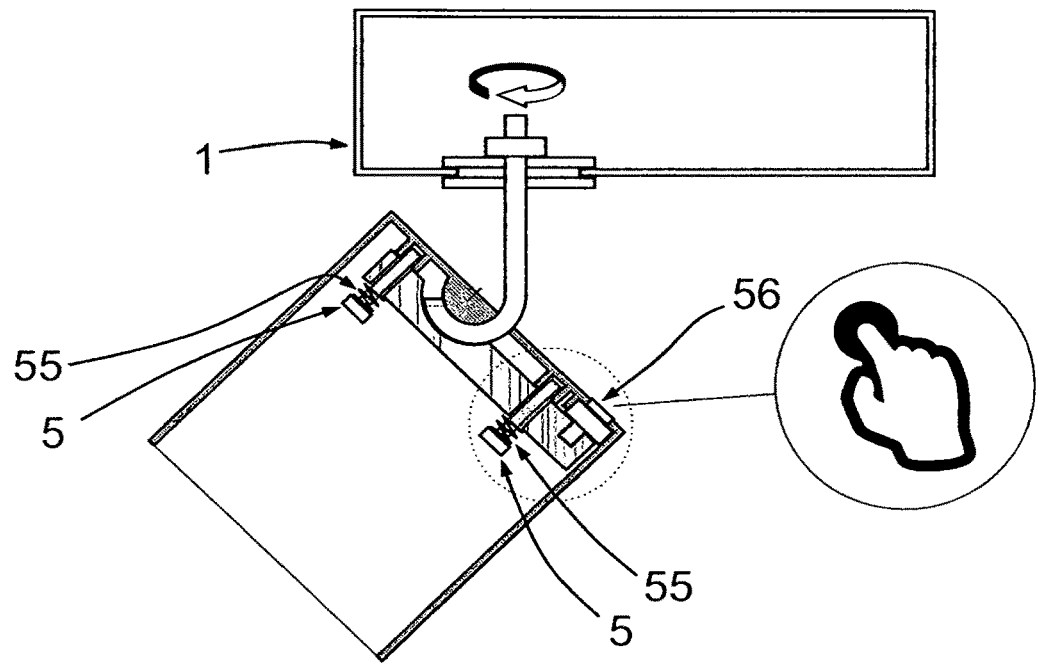

The J-shaped joining part may also be coupled to the male body by installing a disc, in such a way that the hinge system implements azimuthal rotation in addition to the hinge regular rotation, as illustrated in FIGS. 5 and 6.

Figure 7:
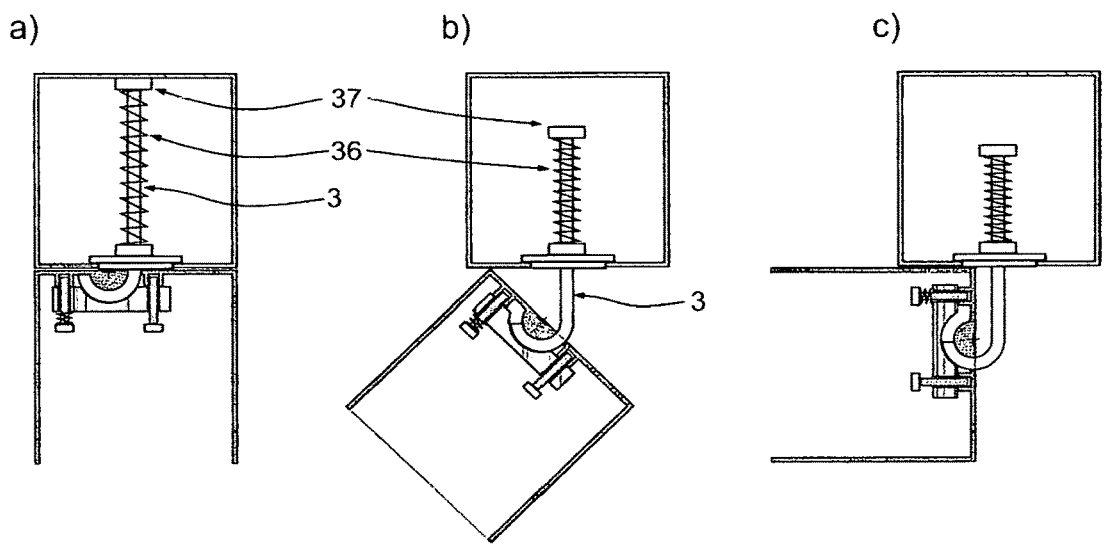
FIG. 7 illustrates three pictures on the same cross-section plane that show the invention with the telescopic or retractable subsystem. Cases for rotation at 0°, 45° and 90° are shown in a), b) and c), respectively.

The embodiment may also consist of a retractable J-shaped joining part integrated in the male body, easily implemented by a spring (36) on the telescopic system connected to the J-shaped joining part end and held by a retainer (37), so retraction level varies progressively with hinge rotation. This embodiment with telescopic hinge, illustrated in FIG. 7, allows to decrease the full system length size, therefore it may be quite interesting for lighting devices and others.

Figure 8:
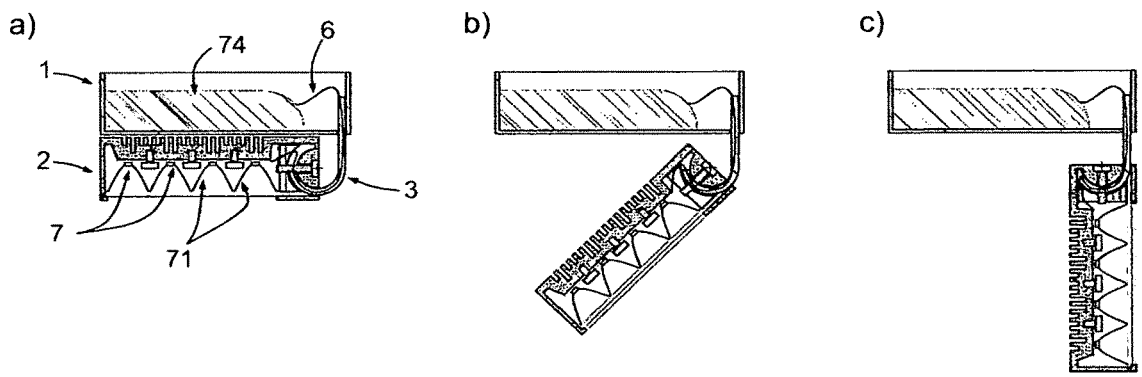
FIGS. 8 and 9 show two different application cases of hinge integrated in an LED compact wallwasher. Views of cross-section for 0°, 45° and 90° are provided, so the male body (1) and female body (2) of the system can be clearly distinguished.
Figure 9:
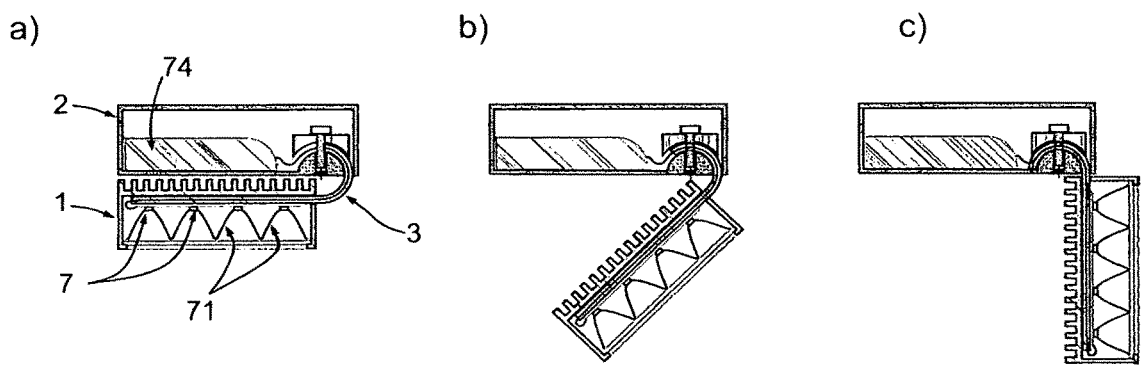

The invention may be integrated as a subsystem in many embodiments, mainly in electronics and lighting systems, allowing maximum simplicity of their components. FIGS. 8 and 9 illustrate embodiments for LED wall-washers and describe the main elements in the system: a female body (2), a male body (1), a lens matrix (71) and a power source system (74). FIG. 8 illustrates an embodiment with the female body (2), the brake system and the opening (22) that comprises the head of the system which contains the LEDs, whereas in FIG. 9 this elements are located in the same part as the power source. It must be emphasized that this document references as a female body (2) the one with the opening (22) where the J-shaped joining part (3) goes through.

Additionally, the hinge has the capability to efficiently transfer heat between its bodies by means of a rigid J-shaped joining part with high thermal conductivity. This part may integrate a phase-change thermal transfer device, such as a heat-pipe or a vapour chamber.

Figure 10:
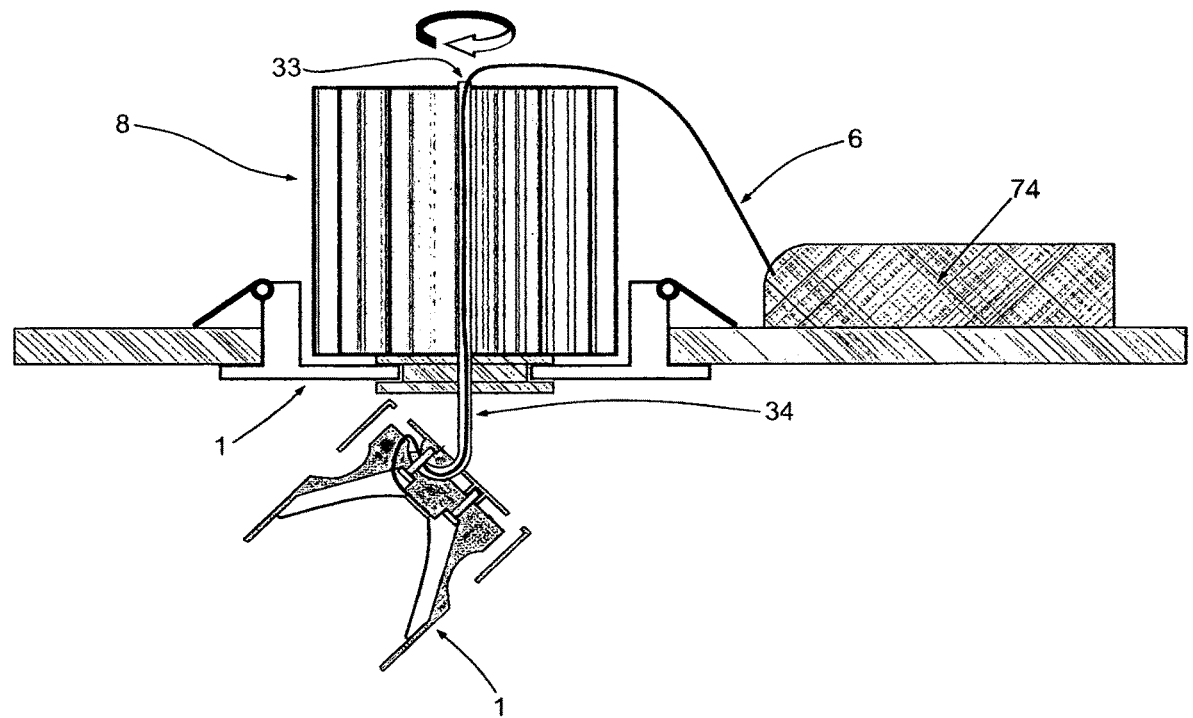
FIG. 10 shows a cross-section view of a recessed LED spotlight with the invention hinge where the J-shaped joining part is mechanically coupled to the male body (1) by means of a disc which allows azimuthal rotation, additionally to the hinge rotation characteristic movement. The J-shaped joining part is hollow to allow power supply; the brake system is fully integrated in the female body (2), which means a reduction in the number of components and facilitates assembly. Besides, the thermal J-shaped joining part (34) includes a phase-change heat transfer device, which transfers heat towards a heatsink (8) thermally attached to the flat end of the J-shaped joining part.

FIG. 10 illustrates a recessable spotlight device in which the female body includes the brake system without the need of an additional element or part to fulfil such role. In this case, the J-shaped joining part is mechanically coupled to the male body by a disc installed in a circular opening on the male body, allowing additional azimuthal rotation to the typical hinge rotational movement. This thermal J-shaped joining part (34) implements a phase-change thermal device thermally coupled to an aluminium heatsink (8) on one end. Depending on the power amount to be dissipated and the product costs, this J-shaped joining part end may be splitted in branches to distribute and dissipate heat more efficiently. This embodiment may be especially useful for high-power spotlights with small head dimensions.

Figure 11:
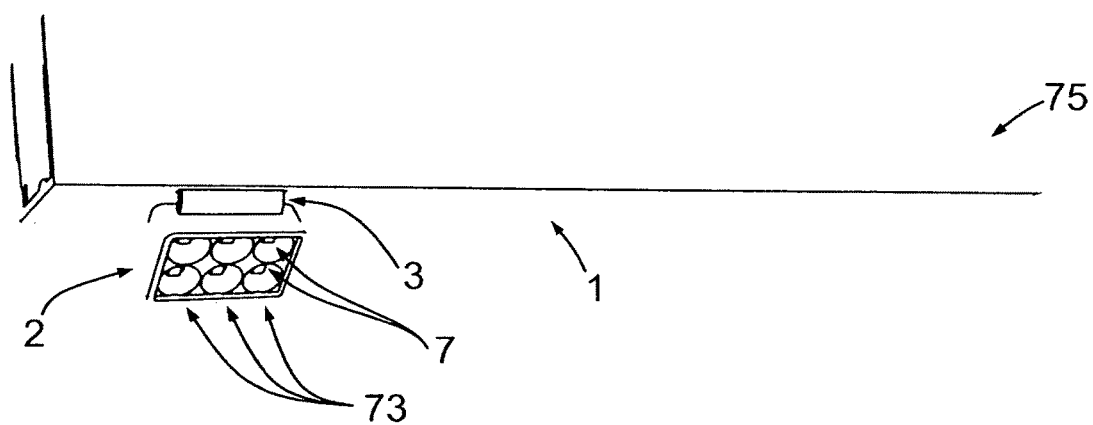
FIGS. 11 and 12 show isometric views of the invention applied to a track LED mini-spotlight; in this case the J-shaped joining part integrates a rigid phase-change thermal transfer device, more specifically a multichannel heatpipe.
Figure 12:
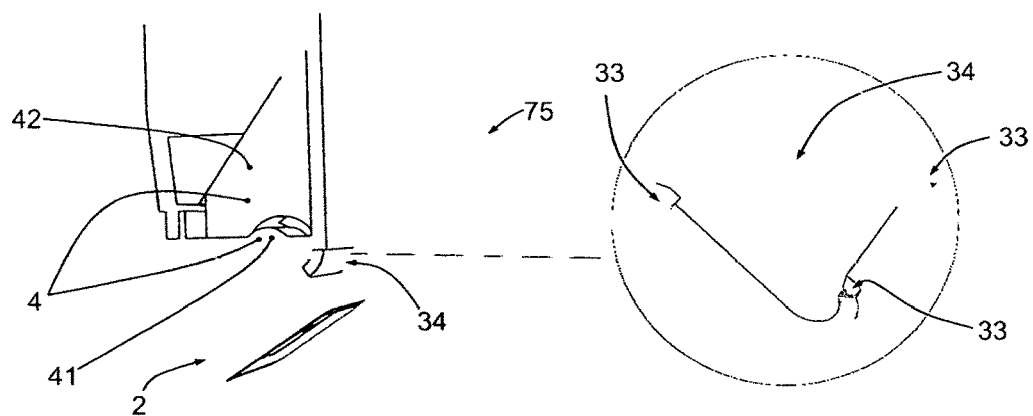

FIGS. 11 and 12 illustrate specific embodiments with a track LED mini-spotlight which integrates the invention with the capability to efficiently transfer the heat generated by the LEDs towards the extrusion metallic track for dissipation purposes. As in the above mentioned case, the LED board is directly in contact with the thermal J-shaped joining part (34) with phase-change thermal transfer capability, which integrates sealed conduits or channels with a liquid that, once changed into vapour, extracts and transfers the heat generated by the LEDs (7) towards the braking system (4) and the fixed track (75) of the product, where a wider radiator area is available to increase transfer heat to the surroundings by convection mechanism. The J-shaped joining part (3) is equipped with hollow conduits or channels (33) to allow a path for wires (6) to provide power to the LEDs. Thanks to this invention, a direct thermal path connects the spotlight head to its fixed track, which improves the current state of the art and other available market solutions. This technology opens the possibility to design more compact products with a much higher power capability.

Figure 13:
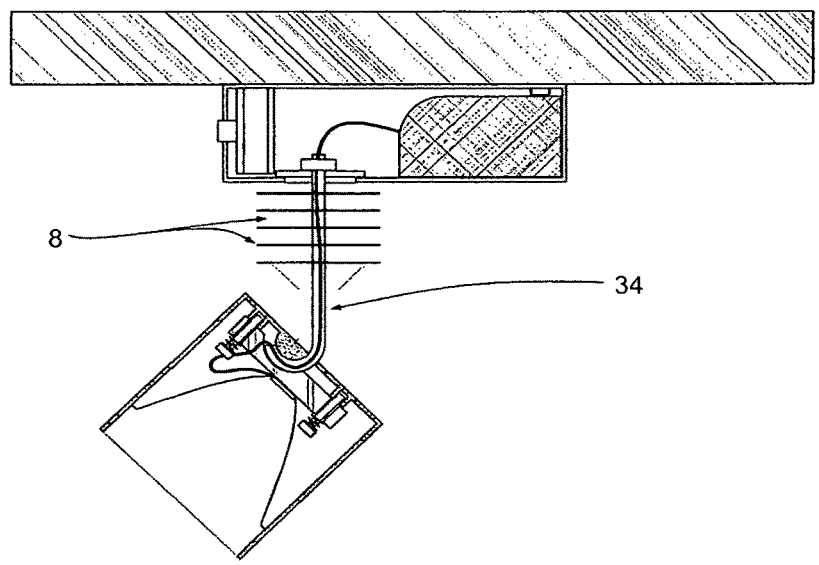
FIG. 13 shows a cross-section view of a luminaire built with the invention which integrates a thermal transfer J-shaped joining part like the one in FIGS. 11 and 12 but with thermal heatsink to increase heat dissipation.

FIG. 13 illustrates another spotlight example with the hinge invention; this embodiment also makes possible heat transfer similarly to the cited-above case, but the thermal J-shaped joining part (34) itself includes a heatsink (8) placed between male and female body in order to dissipate heat originated by the heat source.

Figure 14:
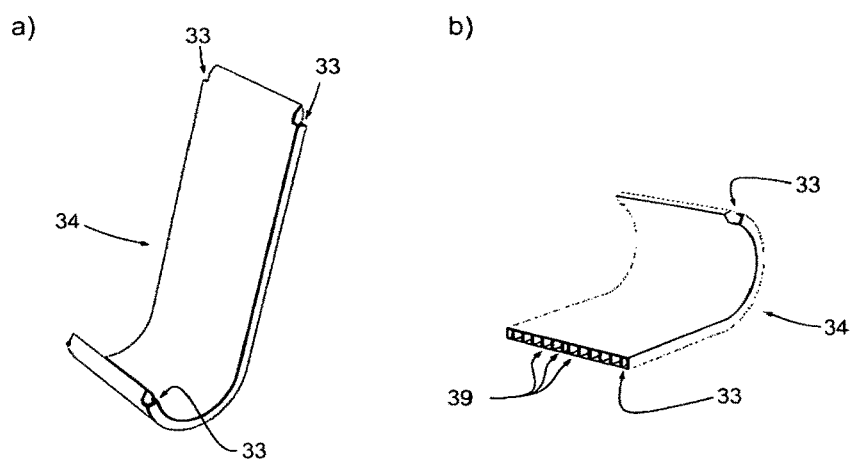
FIG. 14 shows two different isometric views of the cited thermal J-shaped joining part (a) and a cross-section cut (b) where inner channels for thermal transfer and wire paths can be observed.

A thermal J-shaped joining part (34) with conduits or channels in its inner structure as to allow phase-change thermal transfer is illustrated in FIG. 14. A cross-section view of the cited thermal J-shaped joining part can be seen in picture b), in which conduits or channels (33) to pass wires (6) are located on lateral sides and thermal conduits or channels (39) to contain fluid for phase-change thermal transmission are instead in the central inner space.

Figure 15:
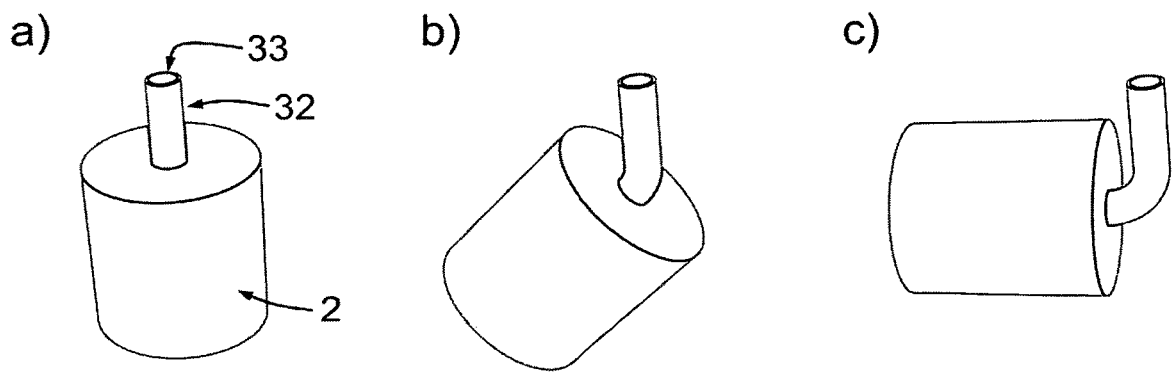
FIG. 15 shows three consecutive rotation positions of the invention with circular cross-section tubular J-shaped joining part (32)
Figure 16:
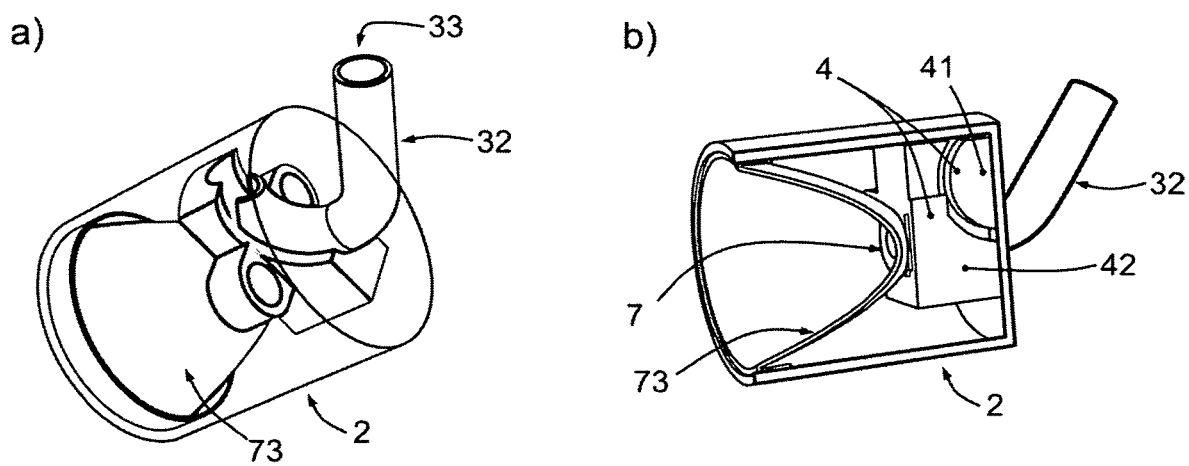
FIG. 16 shows isometric views of such tubular part integrated in a cylindrical spotlight with the female body represented as transparent (a) and in cross-section along the tubular J-shaped joining part (b) such that the inner components can be seen in detail.

The described invention is compatible with any cross-section of the J-shaped joining part, as long as its curved end is the result of the geometry sweep previously described. For instance, embodiments in FIG. 14, 12 or 11 have rectangular cross-section J-shaped joining part whereas FIGS. 15 and 16 illustrate a tubular cross-section J-shaped joining part. In all cases, the J-shaped joining part may be massif or hollow; it may also comprise conduits or channels for thermal fluids or matter protected and hidden from the outside or implemented in a phase-change thermal transfer integrated device.

This hinge invention may be implemented in an LED spotlight as illustrated in FIG. 16, where inner components are shown in a transparent body representation (a) and an embodiment cross-section view (b) for a better understanding of the invention.

DESCRIPTION OF THE PREFERRED EMBODIMENT

Figure 17:
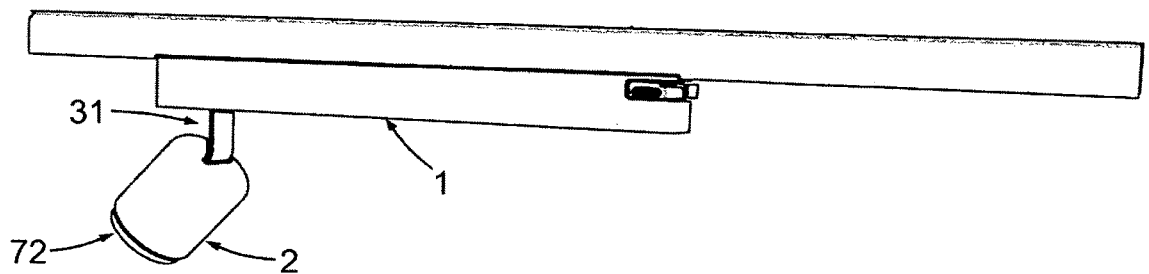
FIG. 17 is an isometric view of a track LED spotlight with a rectangular cross-section laminar J-shaped joining part (31)
Figure 20:
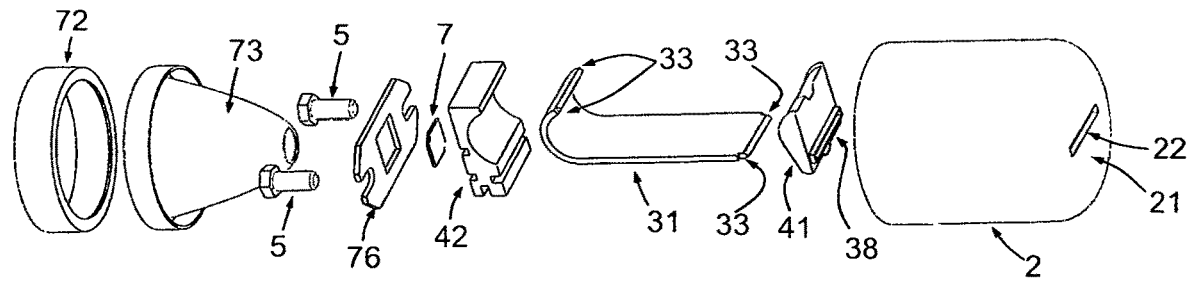
FIG. 20 shows the exploded view with details on the main components.
Figure 21:
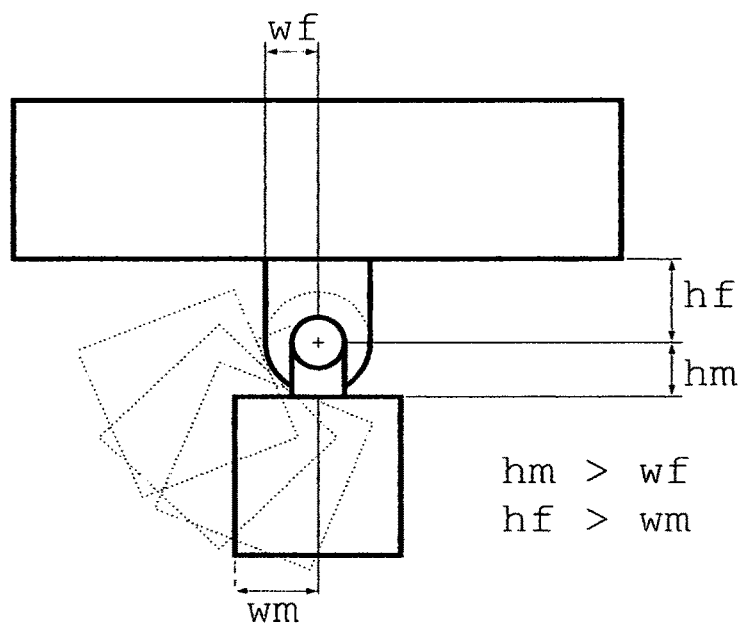
FIG. 21 illustrates a basic scheme of an articulated conventional system to join two bodies showing the technical difficulties found to conceive a hinge between faces of two bodies without presence of any protuberance.

The integration of the present invention in a compact and adjustable LED spotlight is one of the most suitable embodiments, not being a limitation to the present invention. It comprises a rectangular cross-section J-shaped joining part (31), a female body (2), which is the hinge movable element in this case, formed by an aluminium part free of screws or any external protuberance, with a rectangular opening (22) as illustrated in FIGS. 17 and 20; an optic system comprising an antiglare ring (72), a reflector (73) and an LED light source (7), a blocking system with an external brake component (42) in aluminium or copper, where the LED light source is thermally coupled in, and an inner brake component (41), with a metallic sheet part (76) to form the sandwich blocking system. The inner brake protection frame (38) surrounding the J-shaped joining part at the opening in the female body, in a way that scratches or damage due to rotation and movement are prevented on the curved surface of the J-shaped joining part. The brake system constrains the J-shaped joining part movement to rotation and forms a sandwich where the J-shaped joining part is blocked on its curved end by means of a metal sheet part screwed to the inner female body, what exerts pressure enough as to block the hinge movement, except when being manually oriented.

Figure 18:
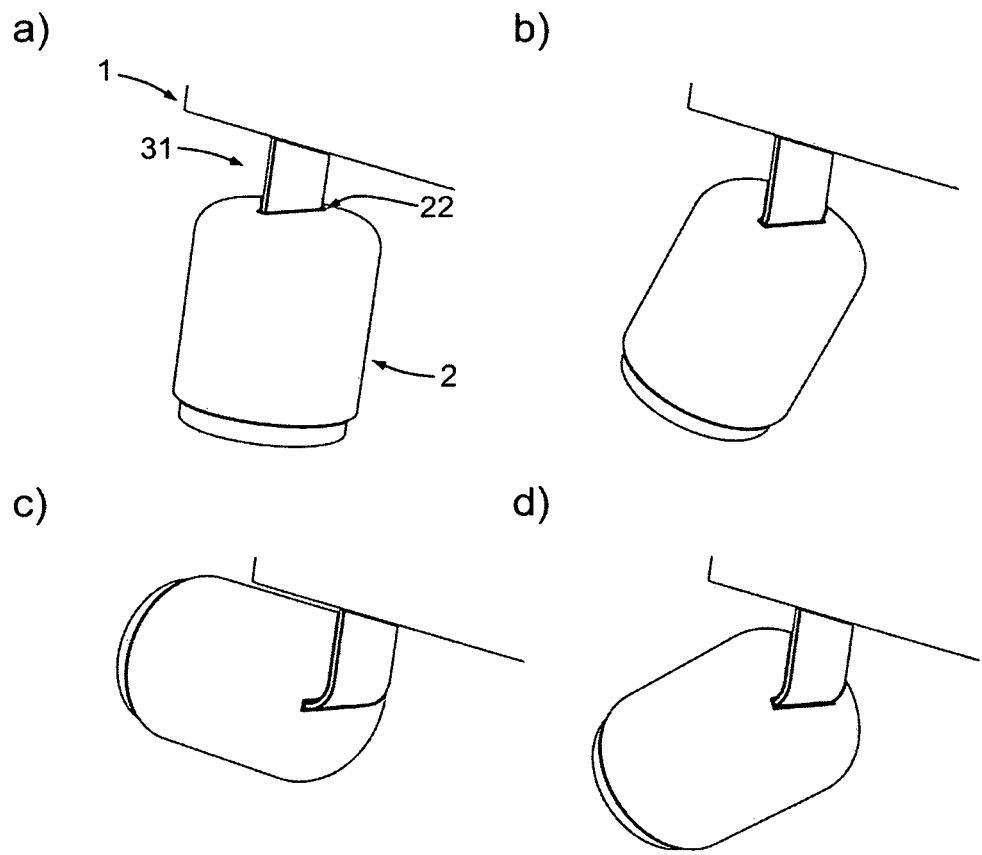
FIG. 18 shows the invention integrated in the LED spotlight in four different angle orientations.
Figure 19:
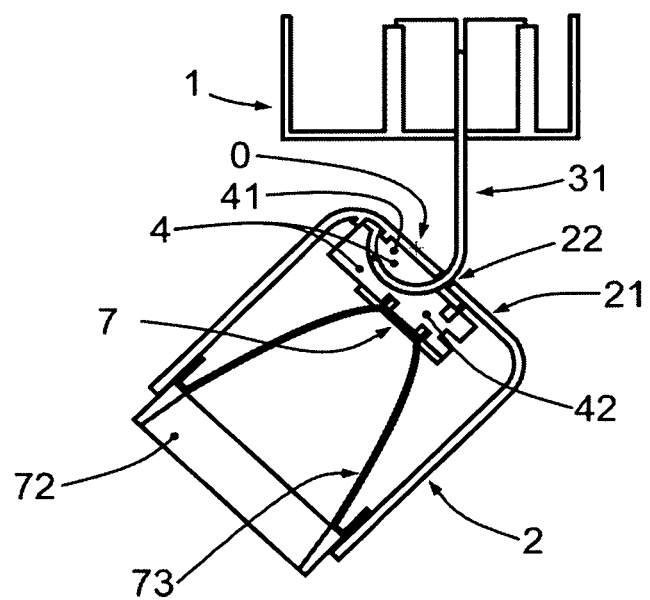
FIG. 19 shows a cross-section view of the LED spotlight in FIGS. 17 and 18.

The hinge movement is precise and smooth, without noticing any mechanical element from the outside, as illustrated in FIG. 18.

The invention claimed is:

1. A mechanical joint system with electrical and/or thermal conduction capability by means of an invisible adjustable hinge applicable as part of a bigger system that mechanically connects two bodies and allows rotation of one body around the other, wherein the mechanical joint system comprises: a male body (1) and female body (2) to be rotated one about the other around a virtual rotation axis (0), i.e. without any physical shaft or pivot support, located on a face (21) of the female body, by means of a J-shaped joining part (3) with arbitrary cross-section, the arbitrary cross-section essentially consisting of a rectangular cross-section on a laminar J-shaped joining part (31), a circular cross-section on a tubular J-shaped joining part (32) or an elliptical one, the J-shaped joining part passes perpendicularly through an access opening (22) on the face of the female body at any rotation position; wherein the J-shaped joining part end located outside of the female body is mechanically fixed or coupled to the male body, in such a way that the geometry of a curved end of the J-shaped joining part is the result of a sweep of the cross-section of the J-shaped joining part along a circumference arc whose axis (0) is placed on the female body opening face; wherein the female body is internally equipped with a brake system (4) that couples, guides and fixes the curved end of the J-shaped joining part (3) and blocks its rotation movement, further comprising two brake components integrated in the female body and controlled by mechanical parts, the mechanical parts comprising screws (5), clamps (57) or wing nuts that act as retainer or blocking elements; the hinge comprising the J-shaped joining part (3) and/or the brake system (4), wherein the hinge further comprises an electrical and/or thermal conductive material for electric energy and/or heat transfer between the male and female bodies, and/or a rigid J-shaped joining part (3), totally or partially hollow, with one or more longitudinal conduits or channels (33).

2. The mechanical joint system with electrical and/or thermal conduction capability by means of an invisible adjustable hinge, as described in claim 1, comprising a rigid J-shaped joining part (3) that is longitudinally equipped with wires (6), cable covers or hoses for electricity power supply and/or data transfer between male and female bodies.

3. The mechanical joint system with electrical and/or thermal conduction capability by means of an invisible adjustable hinge, as described in claim 1, comprising a totally or partially hollow thermal J-shaped joining part (34) that implements a phase-change heat transfer devices, the phase-change heat transfer devices comprising a heatpipe or a vapour chamber.

4. The mechanical joint system with electrical and/or thermal conduction capability by means of an invisible adjustable hinge, as described in claim 1, comprising the J-shaped joining part (3) with a totally or partially grooved or dented surface (35) on its curved end in direct contact with some of the brake system parts and a brake system with one or more teeth (51) that get coupled in such dented surface exerting a calibrated friction between the brake and the J-shaped joining part to control the hinge angular pitch and orientation.

5. The mechanical joint system with electrical and/or thermal conduction capability by means of an invisible adjustable hinge, as described in claim 4, wherein a control of the angular hinge rotation is operated by a motor (52) located in the female body (2), with a gear (53) that engages the dented surface (35) of the J-shaped joining part curved end.

6. The mechanical joint system with electrical and/or thermal conduction capability by means of an invisible adjustable hinge, as described in claim 1, comprising a brake subsystem to be activated from the outside by a blocking screw (54) threaded in one of the brake components in such a way that, when tightened, the friction exerted against the J-shaped joining part is meaningfully increased.

7. The mechanical joint system with electrical and/or thermal conduction capability by means of an invisible adjustable hinge, as described in claim 1, wherein the hinge is equipped with a brake unblocking subsystem comprising a screw (5) with a flexible strip or a spring (55), acting as pressure element, and a mechanical pushbutton (56) to be activated from the outside to release the brake system friction once pressure against springs of the brake system is exerted, allowing the hinge rotation and orientation.

8. The mechanical joint system with electrical and/or thermal conduction capability by means of an invisible adjustable hinge, as described in claim 1, wherein the hinge is equipped with a telescopic subsystem consisting of a straight J-shaped joining part end outside of the female body that perpendicularly crosses one face of the male body and is held by a spring (36) with one end coupled to the male body and the other end to the joint part in such a way that it exerts a force on a joint part perpendicular to the face of the male body towards the inside of the male body that provides the hinge with a retractable function that reduces the total height of the system.

9. The mechanical joint system with electrical and/or thermal conduction capability by means of an invisible adjustable hinge, as described in claim 1, comprising two or more J-shaped joining parts aligned with a shared brake system.

10. The mechanical joint system with electrical and/or thermal conduction capability by means of an invisible adjustable hinge, as described in claim 1, integrating an electronic power device, such as an LED light source (7) or laser, a beam projector, a vision system, a screen (LCD or any other), a semiconductor or any integrated circuit.

11. The mechanical joint system with electrical and/or thermal conduction capability by means of an invisible adjustable hinge, as described in claim 10, comprising an electronic power device attached to the brake system (4) and a thermally conductive J-shaped joining part built in a conductive material or being a phase-change thermal device, with heat fins or a heatsink (8) externally to the female body.

* * * * *